United States Patent
Katsukura et al.

[11] Patent Number: 6,077,424
[45] Date of Patent: Jun. 20, 2000

[54] METHOD FOR AEROBICALLY TREATING WASTEWATER AND A TREATMENT TANK FOR SUCH METHOD

[75] Inventors: Noboru Katsukura; Takehiko Yamada, both of Tokyo; Koji Mishima, Kanagawa-ken; Akinori Nishii, Kanagawa-ken; Sota Nakagawa, Kanagawa-ken; Eiji Tochikubo, Tokyo, all of Japan

[73] Assignee: Ebara Corporation, Tokyo, Japan

[21] Appl. No.: 08/952,609

[22] PCT Filed: May 23, 1996

[86] PCT No.: PCT/JP96/01365

§ 371 Date: Mar. 9, 1998

§ 102(e) Date: Mar. 9, 1998

[87] PCT Pub. No.: WO96/37444

PCT Pub. Date: Nov. 28, 1996

[30] Foreign Application Priority Data

May 23, 1995 [JP] Japan ..................................... 7-146959
Jul. 25, 1995 [JP] Japan ..................................... 7-208562

[51] Int. Cl.⁷ ..................................................... C02F 3/08
[52] U.S. Cl. .......................... 210/151; 210/194; 210/197; 210/220; 210/616
[58] Field of Search .................................... 210/605, 616, 210/621, 629, 150, 151, 194, 195.1, 202, 220, 903, 906, 197

[56] References Cited

U.S. PATENT DOCUMENTS

| | | | |
|---|---|---|---|
| 3,775,307 | 11/1973 | McWhirter et al. | 210/629 |
| 3,865,721 | 2/1975 | Kaelin | 210/629 |
| 4,415,454 | 11/1983 | Fuchs | 210/903 |
| 4,521,311 | 6/1985 | Fuchs et al. | 210/616 |
| 4,566,971 | 1/1986 | Reimann et al. | 210/151 |
| 4,618,426 | 10/1986 | Mandt | 210/629 |
| 4,786,413 | 11/1988 | Reinmann et al. | 210/616 |
| 5,061,368 | 10/1991 | Tada et al. | 210/151 |

FOREIGN PATENT DOCUMENTS

| | | |
|---|---|---|
| 0 208 253 | 1/1987 | European Pat. Off. . |
| 0 377 812 | 7/1990 | European Pat. Off. . |
| 3340547 | 5/1985 | Germany . |
| 40 04 762 | 8/1990 | Germany . |
| 50-103856 | 8/1975 | Japan . |
| 60-197295 | 10/1985 | Japan . |
| 61-36476 | 8/1986 | Japan . |
| 61-38000 | 8/1986 | Japan . |
| 63-97293 | 4/1988 | Japan . |
| 4-310298 | 11/1992 | Japan . |
| 5-253592 | 10/1993 | Japan . |

OTHER PUBLICATIONS

Concurrently filed U.S. Patent Application corresponding to PCT/JP96/01364, Filed May 23, 1996, entitled "Carrier–Separating and Liquid–Collecting Mechanism for Liquid–Waste Treatment Apparatus" by Noboru Katsukura et al.

*Primary Examiner*—Christopher Upton
*Attorney, Agent, or Firm*—Wenderoth, Lind & Ponack, L.L.P.

[57] ABSTRACT

A method for treating liquid-waste utilizing carriers having microorganisms immobilized thereon employs an aerobic treatment tank. At least one underwater agitation type aeration apparatus having an air-diffusing mechanism on a discharge side of an impeller is provided in the treatment tank. While supplying atomized air into the liquid-waste, the carriers and the liquid-waste are circulated through the treatment tank by the underwater agitation type aeration apparatus, to thereby substantially uniformly distribute the carriers in a floating state in the treatment tank. The discharge opening of the underwater agitation type aeration apparatus is provided in the vicinity of a bottom surface of the treatment tank or at an intermediate position with respect to the depth of liquid in the treatment tank. In the latter case, the underwater agitation type aeration apparatus sucks the carriers and the liquid-waste in the vicinity of the bottom surface of the treatment tank through a draft tube extending from the underwater agitation type aeration apparatus toward the bottom surface of the treatment tank.

3 Claims, 5 Drawing Sheets

METHOD FOR AEROBICALLY TREATING WASTEWATER AND A TREATMENT TANK FOR SUCH METHOD

TECHNICAL FIELD TO WHICH THE INVENTION BELONGS

The present invention relates to a method for aerobically treating liquid-waste and a treatment tank used in the method. More particularly, the present invention is concerned with a method for maintaining in an aerobic treatment tank carriers having microorganisms immobilized thereon and aerobically, biologically treating liquid-waste, such as sewage, human excrement and industrial organic liquid-waste. The present invention is also concerned with a treatment tank used in the above-mentioned method.

CONVENTIONAL TECHNIQUE

In recent years, as liquid-waste treatment techniques, an activated sludge method, a biomembrane method and an immobilized microorganism method have been known. From the viewpoint of efficient utilization of land, it has been desired to develop a liquid-waste treatment method which is space-saving, and a method for an aerobic treatment of liquid-waste utilizing carriers having microorganisms immobilized thereon, the improvement of performance of such carriers has attracted attention. The present inventors previously developed a liquid-waste treatment apparatus shown in FIG. 9, in which carriers having microorganisms immobilized thereon are utilized. In the liquid-waste treatment apparatus of FIG. 9, liquid-waste is introduced from an inflow pipe 7 into one end of a treatment tank 1, aerated in the treatment tank 1 and discharged from an outflow pipe 8 as a treated liquid. In the treatment tank 1, carriers 2 having microorganisms immobilized thereon are maintained in a floating state due to fine air bubbles supplied from an air-diffusing means 3, such as a diffuser, an air-diffusing pipe or the like.

The air-diffusing means 3 is disposed on a bottom surface of the treatment tank 1. Air is supplied under pressure from a blower 4 through an air pipe 5 to the air-diffusing means 3, which supplies numerous fine air bubbles into the liquid-waste from a position in the vicinity of the bottom surface of the treatment tank 1. The supplied air bubbles rise through the liquid-waste and partly dissolve in the liquid-waste. The carriers 2 in the liquid-waste are pushed by the rising air bubbles and rise in the treatment tank 1, and settle due to their own weight in a region in which no rising of air bubbles occurs. Thus, the carriers 2 float in the liquid-waste while circulating therethrough. A carrier-separating device 6 is disposed in the treatment tank 1 at an end thereof opposite to the inflow pipe 7. In the carrier-separating device 6, the carriers are separated from the treated liquid discharged from the treatment tank.

In the prior art, as aeration apparatuses for a liquid-waste treatment in which air is diffused through and mixed with the liquid-waste, there have been known an apparatus in which a surface of the liquid-waste is agitated and an apparatus in which air is supplied from a large number of small holes and diffused through the liquid-waste. In addition to the above-mentioned apparatuses, there has been known an underwater agitation type aeration apparatus (an aerator provided with an impeller) having an air-diffusing mechanism on a discharge side of the impeller, which is disclosed in, for example, JP-B2-61-36475, JP-B2-61-36476 and JP-B2-61-38000 (Examined Japanese Patent Publications), and U.S. Pat. No. 4,512,936 (U.S. Patent).

The treatment tank 1 of FIG. 9 is advantageous in that the oxygen-dissolving efficiency of the air-diffusing means 3 is high and that breakage of the carriers 2 does not occur because the agitating force of the air-diffusing means 3 is small. However, the treatment tank 1 of FIG. 9 has the following disadvantages.

(1) The carriers 2 having microorganisms immobilized thereon flow in a horizontal direction, together with a liquid to be treated, from an inflow end (the left end of the treatment tank of FIG. 9) to an outflow end of the treatment tank 1, so that the distribution of carriers becomes non-uniform, such that the concentration of carriers is low in the vicinity of the inflow end of the treatment tank 1 and is high in the vicinity of the outflow end of the treatment tank 1, thereby lowering the treatment performance of the treatment tank. Further, the carrier-separating device 6 receives a force which prevents a flow of carriers in a large amount, and a large amount of carriers concentrate in the vicinity of the carrier-separating device 6, thereby preventing separation of carriers from the treated liquid.

(2) A part of the carriers settle and accumulate in a region between the bottom surface of the treatment tank and the vertical positions of air supply openings of the air-diffusing means 3 disposed on the bottom surface of the treatment tank 1, and therefore do not circulate through the liquid-waste. Thus, a part of the carriers in the treatment tank do not function.

Due to items (1) and (2) above, in order to enable the treatment tank to achieve a predetermined treatment performance, it is necessary to supply carriers in an amount which largely exceeds the scheduled amount.

(3) With respect to the air-diffusing means 3, it is required that an air supply pipe for the air-diffusing means 3 be installed at the bottom of the treatment tank. Further, the air-diffusing means 3 has a large number of small holes over a large area, which are easily clogged, so that the air-diffusing means 3 must be exchanged periodically for maintenance. However, in order to exchange the air-diffusing means 3, a large amount of carriers must be removed from the treatment tank.

(4) In order to obviate the disadvantages mentioned in items (1) and (3) above, a number of proposals have been made, such as employment of a preventive wall for preventing a horizontal flow of carriers and employment of a movable agitating means. However, these proposals are unsatisfactory from the viewpoint of the treating capacity of the treatment tank, costs of equipment and costs of operation (reference is made to especially JP-A-7-124582, JP-A-7-136678, JP-A-7-136679 and JP-A-7-136680, Unexamined Japanese Patent Laid-Opens).

(5) In order to obviate the disadvantage mentioned in item (2) above, it has been proposed to fill with mortar a region (dead zone) between the bottom surface of the treatment tank and the vertical positions of air supply openings of the air-diffusing means 3, in which no circulation of carriers occurs, and it has also been proposed to employ a settling-preventing plate for preventing carriers from settling in the dead zone. However, these proposals are difficult to carry out and costly.

Further, when carriers having microorganisms immobilized thereon are utilized in an aerobic treatment tank (a deep aeration tank) having a depth as large as, for example, about 10 m, the carriers settle at the bottom of the treatment tank, so that treatment performance is drastically lowered. When an air-diffusing apparatus is provided at the bottom of the treatment tank in order to prevent settling of carriers, a high-pressure blower capable of injecting a fine air-bubble jet into a liquid having a great depth is required, thus increasing costs of equipment. In addition, when a fine air-bubble jet is injected into the liquid-waste from a position at a depth as great as about 10 m, nitrogen gas in an excess amount dissolves in the liquid-waste, leading to problems, such that sludge rises in a final sedimentation tank.

PROBLEMS THAT THE INVENTION IS TO SOLVE

It is an object of the present invention to provide a method for aerobically treating liquid-waste and a treatment tank which are free from the above-mentioned disadvantages accompanying prior art techniques. More particularly, it is an object of the present invention to sufficiently agitate and circulate liquid-waste and carriers having microorganisms immobilized thereon (and activated sludge if it is utilized together with the carriers having microorganisms immobilized thereon), to thereby enable the carriers (and the activated sludge) to be uniformly distributed in a floating state in the liquid-waste. It is another object of the present invention to prevent accumulation of the carriers on the bottom surface of the treatment tank. It is still another object of the present invention to enable exchanging of an air-diffusing means to be carried out without removing the carriers from the treatment tank. It is a further object of the present invention to provide a deep aeration tank in which settling of carriers at the bottom of the treatment tank having a large depth is prevented and the problems accompanying dissolution of an excess amount of a nitrogen gas in the liquid-waste are also prevented. It is a still further object of the present invention to provide a method for aerobically treating liquid-waste which is energy-saving and in which high oxygen-dissolving efficiency can be achieved, and a treatment tank used in the above-mentioned method. The other objects and advantages of the present invention will be apparent from the following description taken in connection with the accompanying drawings.

MEANS OF SOLVING THE PROBLEMS

The method of the present invention for treating liquid-waste utilizing carriers having microorganisms immobilized thereon in the aerobic treatment tank comprises: providing and operating in the treatment tank an underwater agitation type aeration apparatus (an underwater aerator) having an air-diffusing mechanism on a discharge side of an impeller; and circulating the carriers and the liquid-waste through the treatment tank by means of the underwater agitation type aeration tank, while supplying atomized air into the liquid-waste, to thereby substantially uniformly distribute the carriers in a floating state in the treatment tank. In the method of the present invention, it is preferred to utilize both carriers having microorganisms immobilized thereon and activated sludge.

In an aerobic liquid-waste treatment tank of the present invention for maintaining carriers having microorganisms immobilized thereon in a floating state in liquid-waste and aerating the liquid-waste, at least one underwater agitation type aeration apparatus having an air-diffusing mechanism on a discharge side of an impeller is provided. The underwater agitation type aeration apparatus is arranged so as to enable the carriers and liquid-waste to circulate through the treatment tank. By operating the underwater agitation type aeration apparatus, the carriers can be substantially uniformly distributed in a floating state in the liquid-waste in the treatment tank. When the aerobic liquid-waste treatment tank is a treatment tank having a relatively small depth, it is preferred that the underwater agitation type aeration apparatus have a discharge opening positioned in the vicinity of the bottom surface of the treatment tank and facing downward or in a transverse direction.

When the aerobic liquid-waste treatment tank is a deep aeration tank having a relatively large depth, the underwater agitation type aeration apparatus is provided in a manner such that the discharge opening is positioned at an intermediate position with respect to the depth of liquid in the aeration tank and faces upward. The term "an intermediate position with respect to the depth of liquid in the aeration tank" used herein means an arbitrary position between the surface of the liquid in the tank and the bottom surface of the tank. Practically, it is most advantageous that the intermediate position with respect to the depth of liquid in the aeration tank be at a position at a distance of 5 m to 6 m from the liquid surface, from the viewpoint of efficiency. In the deep aeration tank, the underwater agitation type aeration apparatus is provided with a draft tube extending toward the bottom surface of the deep aeration tank, which sucks the carriers and liquid-waste in the vicinity of the bottom surface of the aeration tank.

In the present invention, in order to obviate the disadvantage of prior art techniques such that carriers accumulate at a downstream end portion of the aerobic treatment tank due to a flow of the liquid in the treatment tank, the underwater agitation type aeration apparatus which has an excellent ability to form a flow of agitation is employed, instead of a full aeration type apparatus and a one side turning flow type apparatus, both utilizing fine air bubbles supplied from diffusers or air-diffusing pipes. In order to form a uniform flow of agitation, the number and positions of the underwater agitation type aeration apparatuses are appropriately determined, depending on the shape of treatment tank. Thus, the floating carriers are kept uniformly dispersed in the tank and non-uniform distribution of carriers which occurs in prior art techniques can be avoided.

Further, differing from air-diffusing pipes and diffusers, it is unnecessary to install an air supply pipe on the bottom surface of the tank, so that for maintenance of the underwater agitation type aeration apparatus and cleaning the aeration tank, only the underwater agitation type aeration apparatus may be lifted and lowered by a crane or the like.

The aerobic treatment tank and the deep aeration tank according to the present invention can be incorporated in a treatment apparatus for a denitrification treatment of liquid-waste or a treatment apparatus for a denitrification dephosphorization treatment of liquid-waste. When liquid-waste is subjected to an anaerobic treatment and an aerobic treatment, it is preferred that the carriers be returned to an aerobic treatment tank and the liquid-waste be returned to an anaerobic treatment tank. When the carriers and the liquid-waste are separately returned, pumping power becomes high. Further, as a transfer pump disposed at the outflow end of the aerobic treatment tank, an air lift pump, a non-blocking vortex type pump and a single-shaft screw pump can be used so as to prevent breakage of carriers and biomembranes. It is preferred that the amount of liquid transferred by the pump be arbitrarily changed by changing the rotation speed of the motor according to frequency control.

In transferring the carriers and liquid-waste, there may be appropriately employed, instead of pumps, means which are capable of transferring the carriers and liquid-waste without breakage of the carriers and biomembranes. Further, as in the case of the apparatus disclosed in JP-A-5-261393, Unexamined Japanese Patent Laid-Open, carrier-separating means, such as hydrocyclones and trommel sieves, may be provided in a pipe for transferring carriers so that a liquid is transferred to treatment apparatuses in previous steps and the carriers are transferred to the aerobic treatment tank. The aerobic treatment method and treatment tank of the present invention can be applied to, for example, an aerobic treatment process in a circulation type nitrification denitrification method and an aerobic treatment tank in an apparatus used in the method, in which method an oxygen-free process, an aerobic process and a precipitation process are successively conducted, while circulating a liquid from the aerobic process to the oxygen-free process and returning sludge precipitated in the precipitation process to the oxygen-free process, or an aerobic treatment process in a denitrification dephosphorization activated sludge method and an aerobic treatment tank in an apparatus used in the method, in which method an anaerobic process, an oxygen-free process, an aerobic process and a precipitation process are successively conducted, while returning sludge precipitated in the precipitation process to the anaerobic process.

In the present invention, at least one underwater agitation type aeration apparatus is provided in the aerobic treatment tank. When the vertical cross-section of the treatment tank in the longitudinal direction thereof is rectangular, a plurality of underwater agitation type aeration apparatuses are employed, and the liquid in the treatment tank is uniformly agitated so as to ensure that a flow of liquid is provided throughout the treatment tank. Further, by supplying air to the underwater agitation type aeration apparatuses, the inside of the treatment tank can be uniformly maintained under aerobic conditions, to thereby greatly reduce the need for maintenance and periodic inspections. The carriers having microorganisms immobilized thereon usable in the present invention are preferably in a particulate form and made of, for example, sand, activated carbon, polyurethane foam, polyvinyl alcohol, polypropyrene, polyethylene, polyethylene glycol and cellulose. However, in the present invention, the carriers having microorganisms immobilized thereon are not limited to carriers made of the above-mentioned materials. The apparent specific gravity of the carriers is preferably a value which is slightly larger than that of a liquid to be treated (liquid-waste), for example, about 1.02. As a method for immobilizing microorganisms on the carriers, an adhesion immobilization method also may be employed. An entrapment immobilization method also may be employed. It is preferred that carrier outflow-preventing means comprising a porous member, such as a net, a grating, a punching plate, a wedge wire screen or the like, be provided at the outflow end of the aerobic treatment tank, in order to prevent an outflow of carriers.

According to another embodiment of the present invention, in a deep aeration tank utilizing flowable carriers having microorganisms immobilized thereon, an upwardly discharging underwater mechanical agitation type aeration apparatus having a discharge opening provided at an intermediate position with respect to the depth of liquid in the aeration tank is provided, and a suction opening of the aeration apparatus and the bottom surface of the tank are connected by the draft tube. In the deep aeration tank, a plurality of underwater agitation type aeration apparatuses are provided, such that they are arranged in a longitudinal direction of the aeration tank in a single row or a plurality of rows. The bottom of the aeration tank may be inclined toward a suction opening of the draft tube so that the carriers can easily move.

OPERATION OF THE INVENTION

In the present invention in which the underwater agitation type aeration apparatus having an excellent agitating ability is used, non-uniform distribution of carriers can be markedly prevented by uniformly agitating the liquid in the aerobic treatment tank, without charging into the aerobic treatment tank extra carriers corresponding to carriers which accumulate on the bottom surface of the aerobic treatment tank and do not function. Further, in the present invention in which the underwater agitation type aeration apparatus is used in the aerobic treatment tank, as compared to the conventional full aeration type apparatus utilizing fine air bubbles, the oxygen-dissolving efficiency of the air-diffusing means is not lowered with time due to clogging of the air-diffusing means, so that the treatment performance of the aerobic treatment tank becomes high. Further, in maintenance of the aeration apparatus, a cumbersome operation for removal of carriers is unnecessary.

BRIEF DESCRIPTION OF THE DRAWINGS

FIG. 4(a) is a top view, FIG. (4(b) is a cross-sectional view of FIG. 4(a), taken along the line A—A, and FIG. 4(c) is a cross-sectional view of FIG. 4(a) taken along the line B—B.

FIG. 5(a) is a top view, FIG. 5(b) is a cross-sectional view of FIG. 5(a), taken along the line A—A, and FIG. 5(c) is a cross-sectional view of FIG. 5(a), taken along the line B—B.

BEST MODE FOR CARRYING OUT THE INVENTION

Figure 1:
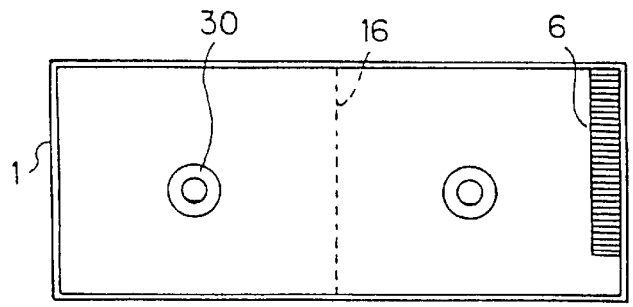
FIG. 1 is a top view of a first embodiment of an aerobic treatment tank of the present invention.
Figure 2:
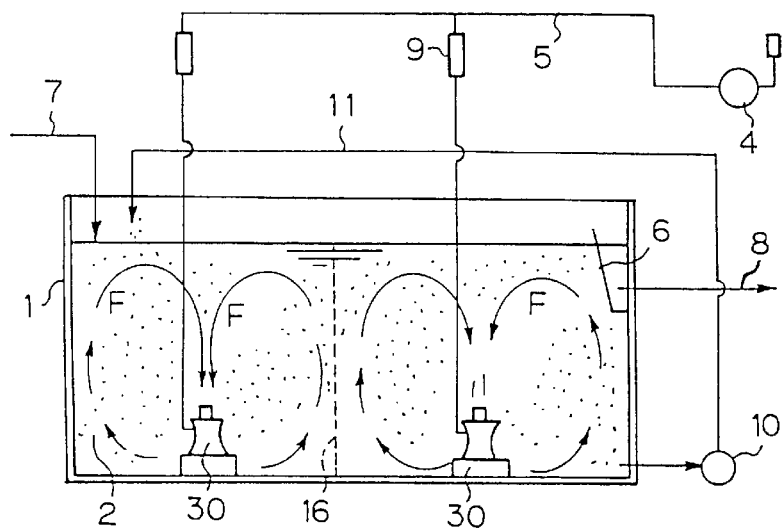
FIG. 2 is a view showing a vertical cross-section of the treatment tank of FIG. 1 in a longitudinal direction thereof.

Hereinbelow, embodiments of the present invention are described, with reference to the accompanying drawings. However, the present invention is not limited to the following embodiments and is defined by the appended claims. In the drawings, like parts and portions are designated by like numerals, and overlapping is avoided with respect to description of those parts and portions. FIG. 1 is a top view of a first embodiment of an aerobic treatment tank of the present invention, and FIG. 2 is a view showing a vertical cross-section of the treatment tank of FIG. 1. In the top view of FIG. 1, a treatment tank 1 is divided into front and rear half portions by a broken line 16, and one underwater agitation type aeration apparatus 30 is disposed in each of the front half portion and the rear half portion. The broken line 16 is an imaginary line for explaining a position and does not indicate that a partition is provided in the treatment tank 1. With respect to each of the half portions in the top view of the treatment tank 1, the ratio of length to width is preferably 1:1. As shown in FIG. 2, circulating flows F are formed in the treatment tank 1, and due to these circulating flows F, microorganism-immobilized carriers 2 are substantially uniformly dispersed and float in the entire treatment tank 1 without a partition.

In order to prevent a concentration of the carriers in an outflow end of the treatment tank 1 due to a flow of a liquid to be treated (liquid-waste) in the treatment tank 1, a carrier-transferring pump 10 may be provided at the outflow end of the treatment tank 1. The carrier-transferring pump 10 sucks the carriers 2 in the vicinity of the outflow end of the treatment tank 1, and transfers the carriers 2 through a conduit 11 to an inflow end of the treatment tank 1. By use of the carrier-transferring pump, it has become possible to finely control the concentration of carriers in the treatment tank 1. The treatment tank 1 in FIGS. 1 and 2 has a carrier-separating device 6, a treated liquid-discharging pipe 8, a blower 4, an air pipe 5, airflow meters 9 and the like. In the treatment tank in FIGS. 1 and 2, underwater agitation type aeration apparatuses are provided, instead of conventional air-difusing apparatuses for supplying fine air bubbles to the treatment tank, so that oxygen-dissolving efficiency is stable during operation over a prolonged period of time. Consequently, not only does treatment performance become high, but also the need for maintenance and inspections can be greatly reduced.

Figure 3:
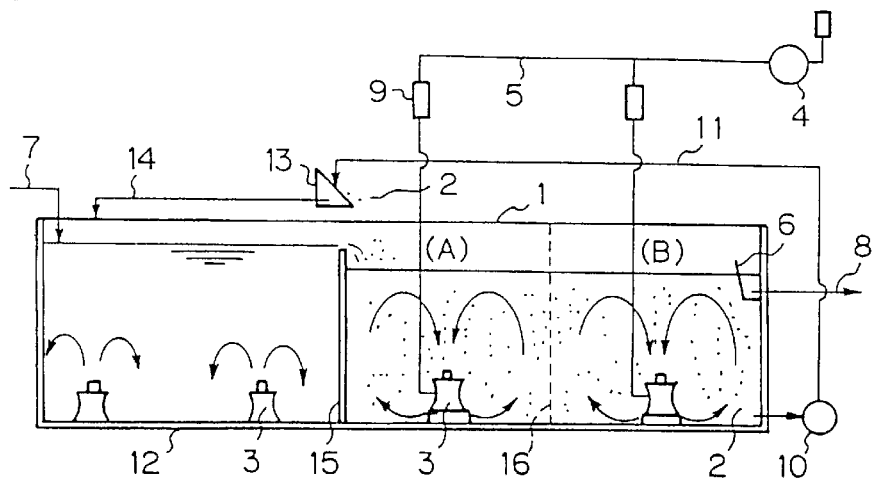
FIG. 3 is an explanatory view of a vertical cross-section of a nitrification denitrification apparatus in which an aerobic treatment tank of the present invention is incorporated.

FIG. 3 is an explanatory view of a vertical cross-section of a nitrification denitrification treatment apparatus in which the aerobic treatment tank is incorporated. In FIG. 3, the aerobic treatment tank 1 has the same construction as that of the treatment tank 1 of FIG. 2, and is used in combination with an oxygen-free tank 12. In the nitrification denitrification treatment apparatus of FIG. 3, liquid-waste flows from the inflow pipe 7 to the oxygen-free tank 12, together with a nitrified circulating liquid which has been separated from the carriers by a separation device 13. In the oxygen-free tank 12, the liquid-waste is subjected to a denitrification treatment and flows into the aerobic treatment tank 1 from an inlet provided on a top of a wall 15 between the oxygen-free tank and the aerobic treatment tank 1. In the treatment tank 1 in which circulating flows are formed by the underwater agitation type aeration apparatuses, the liquid-waste is subjected to a nitrification treatment to a satisfactory degree. The liquid-waste thus treated in the treatment tank 1 is discharged from the treatment tank 1 through the carrier-separating device 6. The carriers and nitrified circulating liquid which have been transferred by the carrier-transferring pump 10 are separated from each other as the carriers 2 and a nitrified circulating liquid 14 by the separation device 13. The nitrified circulating liquid 14 is circulated to the oxygen-free tank 12.

Next, explanation is made of a nitrification denitrification treatment which was conducted using the nitrification denitrification treatment apparatus in which the aerobic treatment tank 1 of FIG. 3 is incorporated.
(a) A liquid to be treated: municipal sewage
(b) Construction of apparatus
  oxygen-free tank: 400 m³ (residence time 4.0 hours)
  aerobic treatment tank: 400 m³ (residence time 4.0 hours)
  total 800 m³ (HRT=8.0 hours)
  amount of treated liquid: 100 m³/hr
  amount of returned sludge: 50 m³/hr
  amount of nitrified circulating liquid: 200 m³/hr
  MLSS: 2,000 mg/liter
  airflow rate: treatment tank portion A; 300 Nm³/hr
    treatment tank portion B; 300 Nm³/hr In each of the treatment tank portion A and the treatment tank portion B, one underwater agitation type aeration apparatus having an oxygen-dissolving efficiency of 15% was provided.

Results of operation

It was confirmed that in the treatment tank, circulating flows were formed by the underwater agitation type aeration apparatuses and the liquid in the treatment tank was a homogeneous mixture. As a result of intensive studies, it was found that non-uniformity with respect to the distribution of carriers in the treatment tank was within ±5%. With respect to both the treatment tank portions A and B, the nitrification performance was maintained at a high level. The amount of ammoniacal nitrogen in the treated liquid was constantly 1 mg/liter or less.

Figure 4:
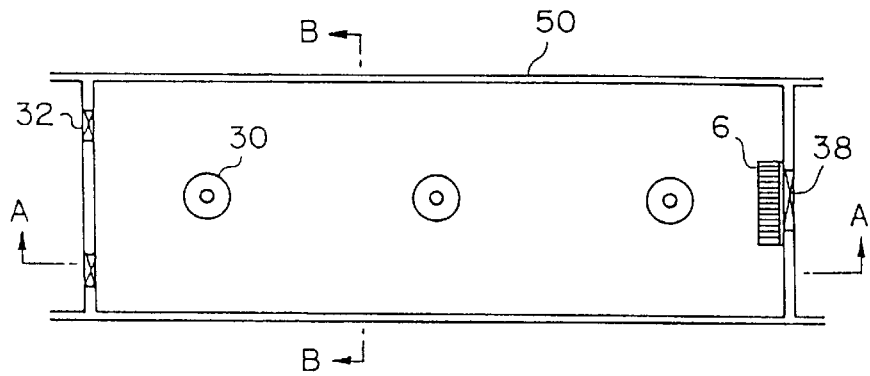
FIGS. 4(a)–4(c) illustrations of the construction of a deep aeration tank according to a second embodiment of the present invention.
Figure 4:
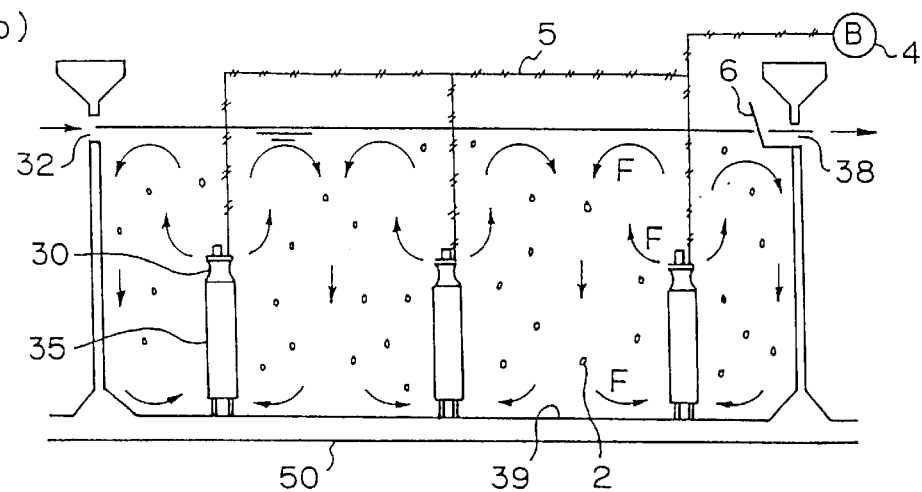
Figure 4:
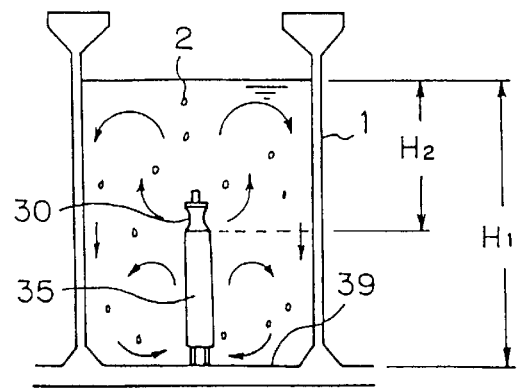

Next, a third embodiment of the present invention is explained, with reference to FIGS. 4(a)–4(c). underwater agitation type aeration apparatuses 30, are provided at a depth $H_2$ of from 3 m to 6 m, preferably about 5 m, from the viewpoint of the discharge pressure of the blower and supersaturation of a nitrogen gas. A draft tube 35 extending between each underwater agitation type aeration apparatus 30 and a bottom surface of an aeration tank 50 generally has an inner diameter of from 40 mm, to 240 mm, which is suitable for ensuring a velocity of an upward flow of liquid such that the carriers 2 stably rise in the draft tube 35. Examples of the carriers 2 include hydrophilic gels in a particulate form having a diameter of from 1 mm to 10 mm, pieces of plastics, high molecular carriers having fibers entwined therein like aegagropilas, sponges, expandable ceramics and the like.

The deep aeration tank 50 may be employed as an aeration tank in a standard activated sludge method, a nitrification tank (an aerobic tank) in the nitrification denitrification method, an aerobic tank in an anaerobic-oxygen-free-aerobic method or the like. As the underwater agitation type aeration apparatus 30, apparatuses which have conventionally been employed as underwater agitation type aeration apparatuses are usable. However, when the carriers are soft, various measures for preventing breakage of carriers must be taken, such as arrangements of the position and rotation speed of the impeller of apparatuses 30 to cause no breakage of the carriers, or smooth finish of fluid passages.

The deep aeration tank 50 of FIGS. 4(a) and 4(b) has a form of a width of 8 m, a length of 24 m and a depth ($H_1$) of 10 m, and has a raw liquid- introducing port 32 and a treated liquid—discharging port 38. The separation device (carrier-separating screen) 6 is provided at the treated liquid-discharging port 38, in order to prevent an outflow of the carriers 2. As the underwater agitation type aeration apparatus 30, three 15-kW underwater agitation type aeration apparatuses are longitudinally provided in the aeration tank 50. The depth $H_2$ at which the underwater agitation type aeration apparatuses 30 are provided is 5 m. The underwater agitation type aeration apparatus 30 is an upwardly discharging type, and the suction opening of the aeration apparatus at a lower part thereof and a bottom surface 39 of the tank are connected by the draft tube 35 having an inner diameter of 1,360 mm. The carriers 2 are made of hydrophilic gel and have a particulate diameter of 4 mm and a specific gravity of 1.02, and are used in an amount of 15 V/V% in terms of a volume percentage.

In the underwater agitation type aeration apparatus 30, agitating blades for forming a circulating flow rotate, and air is flowed from the air pipe 5 in the vicinity of the agitating blades at a rate of 8 to 18 Nm$^3$/hr. As a result, in the aeration tank, flow patterns are formed as indicated by arrows F in FIG. 4(b). The carriers 2 do not settle on the bottom surface 39 and smoothly flow in the aeration tank. In this instance, the velocity of an upward flow of liquid in the draft tube 35 is from 30 m to 40 m/min. The setting velocity of the carriers 2 is from 2 m to 3 m/min. Thus, the carriers 2 stably rise in the draft tube 35.

Figure 5A:
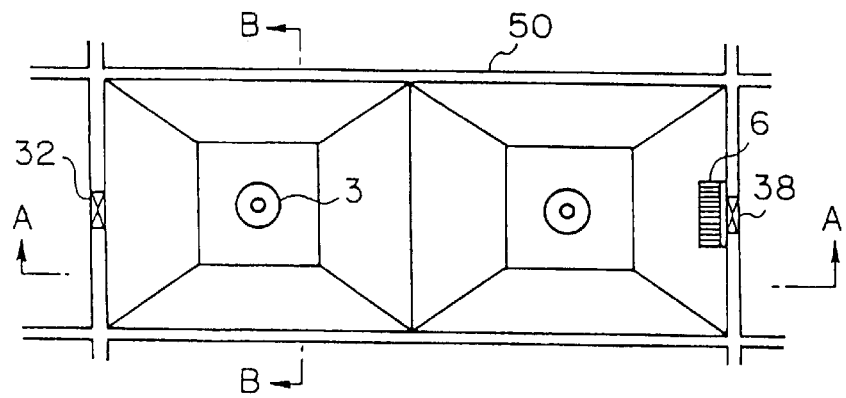
FIGS. 5(a)–5(c) show illustrations of the construction of a deep aeration tank according to a third embodiment of the present invention.
Figure 5B:
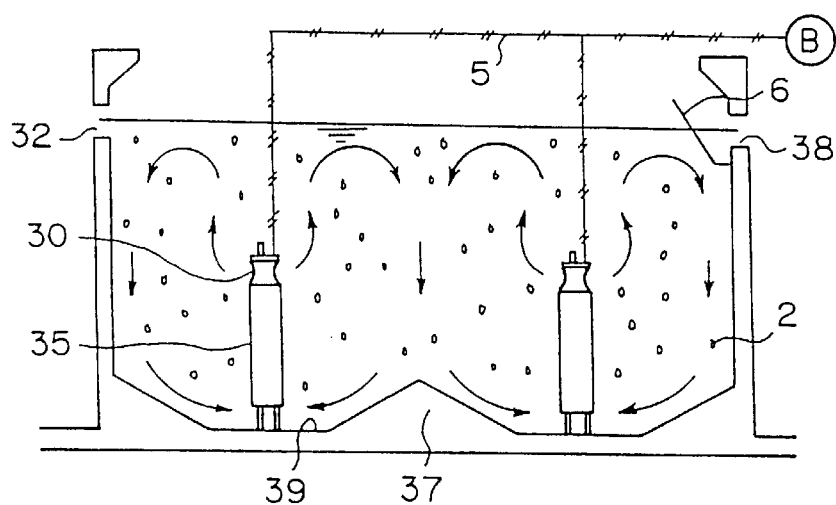
Figure 5C:
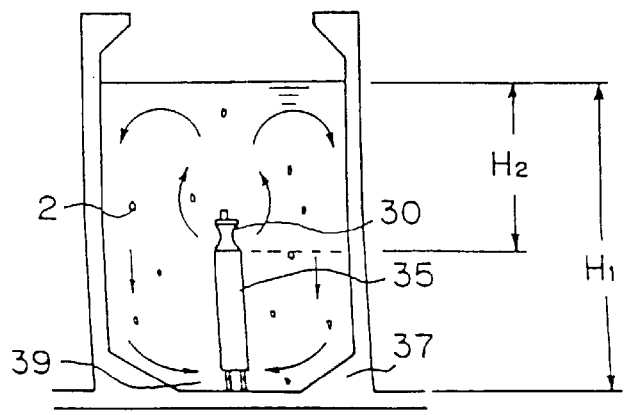

FIGS. 5(a)–5(c) show illustrations of the construction of the deep aeration tank 50 according to a third embodiment of the present invention. FIG. 5(a) is a top view, FIG. 5(b) is a cross-sectional view of FIG. 5(a) taken along the line A—A and FIG. 5(c) is a cross-sectional view of FIG. 5(a), taken along the line B—B. The deep aeration tank 50 of FIGS. 5(a)–5(c) has a form of a width of 8 m, a length of 20 m and a depth ($H_1$) of 10 m. Two 7.5-kW upwardly discharging underwater agitation type aeration apparatuses 30 are provided at a depth ($H_2$) of 5 m. In this embodiment, in order to prevent settling of the carriers 2 at corner portions of the aeration tank 50, bottom 39 has inclined surfaces 27 inclined at an angle of 30 degrees toward the suction openings of the draft tubes 35.

In the deep aeration tank 50 of FIGS. 5(a)–5(c), plastic pieces having a controlled specific gravity of 1.03 and having a particulate diameter of 5 mm were used as the carriers 2 in an amount of 20 V/V%, and air was flowed through the aeration tank 50 at a rate of 4 to 6 Nm$^3$/min. As a result, flow patterns were formed as indicated in FIG. 5(b), and the carriers 2 smoothly flowed in the aeration tank. In this embodiment, the carriers can be caused to stably flow in the deep aeration tank. By use of the underwater agitation type aeration apparatus 30, aerating power can be reduced, as compared to a turning flow type apparatus. In the underwater agitation type aeration apparatus 30, the agitating force in the tank is large, so that the liquid in the tank becomes a complete mixture. Thus, the distribution of the carriers in the tank becomes uniform and the abilities of the carriers can be utilized to a maximum degree.

Figure 6:
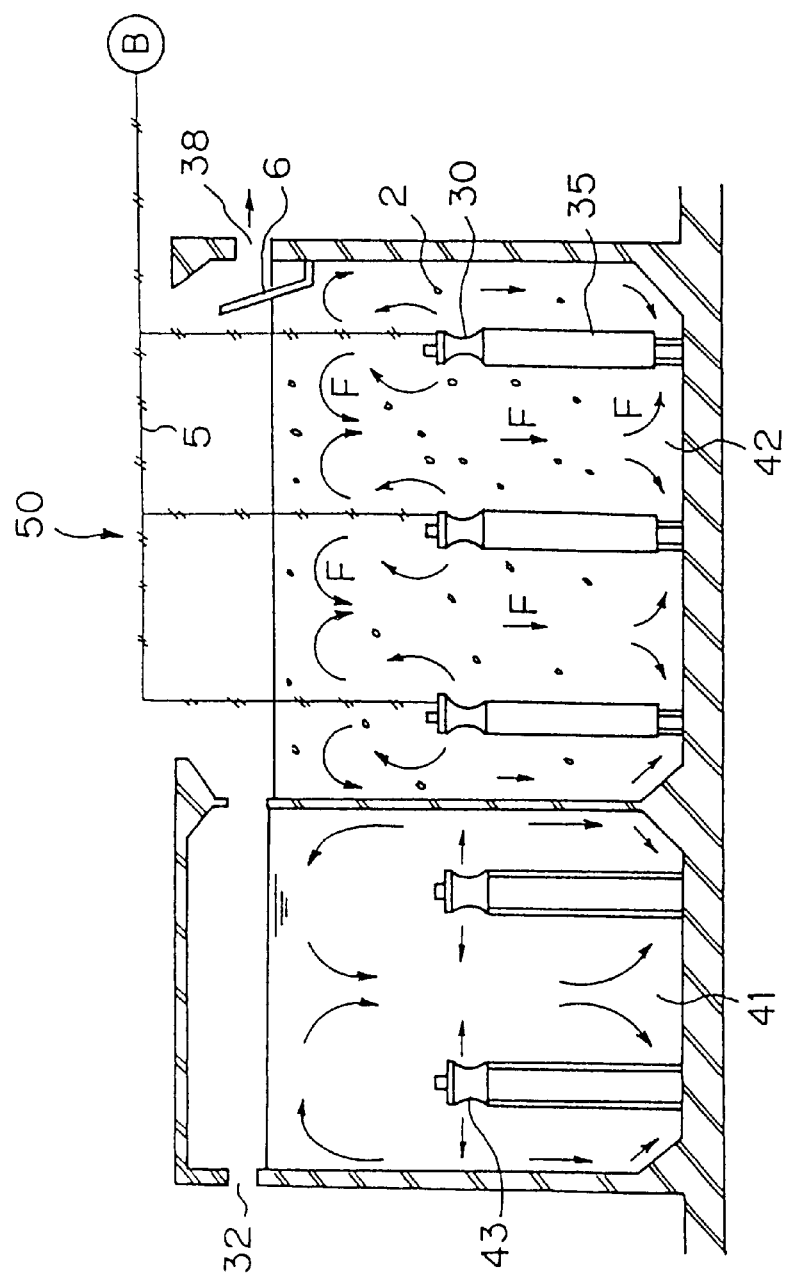
FIG. 6 is an explanatory view of a vertical cross-section of a nitrification denitrification apparatus in which the deep aeration tank is incorporated.

FIG. 6 is an explanatory view of a vertical cross-section of a nitrification denitrification apparatus in which the deep aeration tank is incorporated. In FIG. 6, the deep aeration tank 50 was employed as a nitrification tank (an aerobic tank) 42 in a circulation type nitrification denitrification apparatus, and operated under conditions as mentioned below.

(a) Raw liquid (introduced from the raw liquid-introducing port 32):
  primarily treated liquid of municipal sewage:
    BOD 100 mg/liter
    NH$_4$—N 30 mg/liter
    amount of liquid: 15,000 m$^3$/day
(b) Deep aeration tank:
  denitrification tank 41:
    6.5 m (width)×31 m (length)×10 m (depth)
  effective capacity: 2,000 m$^3$
  underwater agitation apparatus 43: DSR-24OUP (manufactured and sold by EBARA Corp., 30 kW)×2 units
  nitrification tank 42:
    6.5 m (width)×23 m (length)×10 m (depth)
  effective capacity: 1,470 m$^3$
  underwater agitation type aeration apparatus 30: DSR-14OUP (manufactured and sold by EBARA Corp., 1 kW)×3 units
  draft tube: 140 mm (inner diameter)×4 m×3 units
  amount of air for aeration: 12 Nm$^3$/(min·unit)×3 units
(c) Carriers 2:
  material: hydrophilic gel of polyethylene glycol
  particulate diameter: 4 mm
  specific gravity: 1.02
  amount of carriers charged: 220 m$^3$ in terms of a bulk volume (percentage of charging 15 V/V%)
(d) MLSS: 2,500 mg/liter
(e) Results of operation:
  Flow patterns were formed in the aeration tank as indicated by arrows F in FIG. 6. The carriers flowed in the tank without settling on the bottom surface. The concentration of carriers in the tank was uniform (15%). As a result, the amounts of BOD, T—N and NH$_4$-N in a treated liquid (discharged from the treated liquid-discharging port 38) were 5.4 mg/liter, 9.5 mg/liter and 0.4 mg/liter, respectively. Therefore, the average quality of the treated liquid was excellent.

Figure 7:
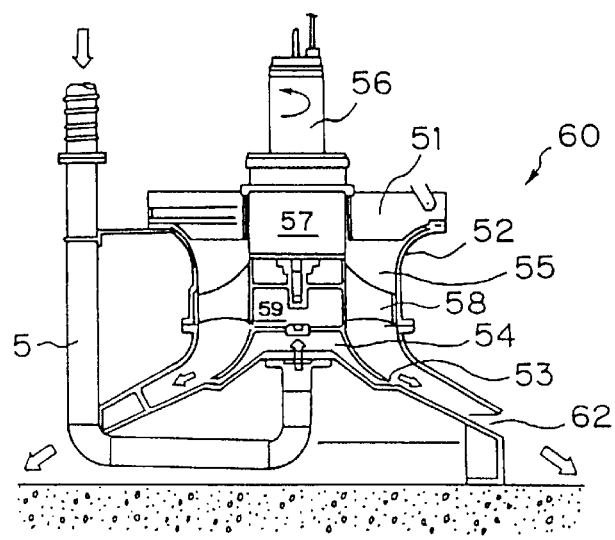
FIG. 7 is an explanatory view of a vertical cross-section of a first embodiment of an underwater agitation type aeration apparatus used in the present invention.

FIG. 7 is an explanatory view of a vertical cross-section of a first embodiment of the underwater agitation type aeration apparatus used in the present invention. An aeration apparatus 60 of FIG. 7 is a downwardly discharging type in which an impeller 59 having blades 58 adapted to be rotated by an electric motor 56 through a gear reducer 57 is contained in an outer casing 52. In the aeration apparatus 60, the liquid-waste and carriers are sucked from a suction opening 51 facing upward, flow through a flow passage 55 in accordance with rotation of the blades 58 and are discharged from a discharge opening 62 facing is a transverse direction below the flow passage 55. Air is supplied under pressure from the air pipe 5 to an air casing 54 provided on a discharge side of the impeller 59. The supplied air is introduced as fine air bubbles from an air discharge opening 53 into the liquid-waste flowing through the flow passage 55.

In order to prevent breakage of the carriers and separation of microorganisms from the carriers due to the aeration apparatus 60, the distance between the outer casing 52 and the tips of the blades 58 is determined as a value which is larger than the particulate diameter of the carriers. The blades 58 are smoothly finished by a grinder, a resin lining or the like. The peripheral velocity of the tips of the blades 58 is about 10 m/second or less.

Figure 8:
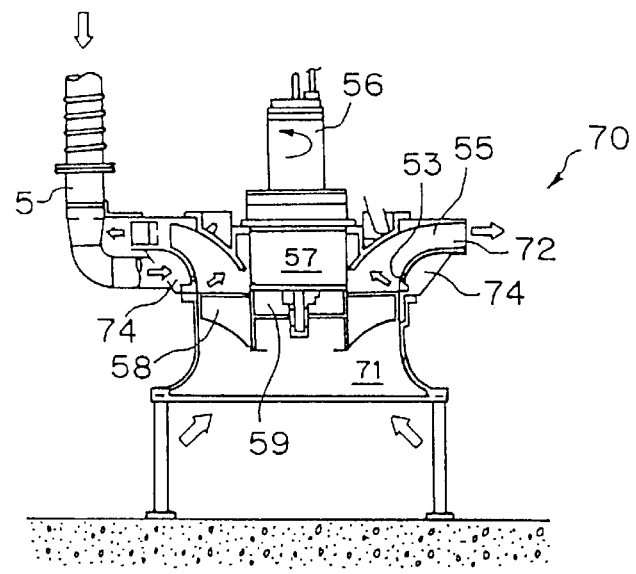
FIG. 8 is an explanatory view of a vertical cross-section of a second embodiment of an underwater agitation type aeration apparatus used in the present invention.
Figure 9:
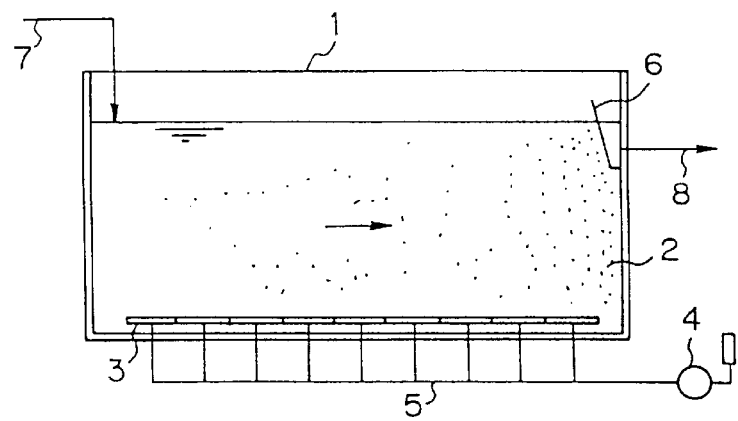
FIG. 9 is an explanatory view of a vertical cross-section of a conventional aerobic treatment tank utilizing carriers.

FIG. 8 is an explanatory view of a vertical cross-section of a second embodiment of the underwater agitation type aeration apparatus used in the present invention. An aeration apparatus 70 of FIG. 8 is an upwardly discharging type in which the impeller 59 having the blades 58 adapted to be rotated by the electric motor 56 through the gear reducer 57 is contained in the outer casing 52. In the aeration apparatus 70, the liquid-waste and carriers are sucked from a suction opening 71 facing downward, flow through the flow passage 55 in accordance with rotation of the blades 58 and are discharged from a discharge opening 72 facing in a transverse direction above the flow passage 55. Air is supplied under pressure from the air pipe 5 to an air casing 74 provided in a part of the outer casing 52 on the discharge side of the impeller 59. The supplied air is introduced as fine air bubbles from the air discharge opening 53 into the liquid-waste flowing through the flow passage 55. In order to prevent breakage of the carriers and separation of microorganisms from the carriers due to the aeration apparatus 70, the same measures as in the aeration apparatus 60 of FIG. 7 are taken.

EFFECTS OF THE INVENTION

In the present invention, liquid-waste and microorganism-immobilized carriers in the aerobic treatment tank are strongly agitated by the underwater agitation type aeration apparatus, so that the carriers can be substantially uniformly distributed in a floating state in the treatment tank and hence, not only can liquid-waste treatment performance be improved, but also separation between carriers and a treated liquid in a carrier-separating device can be facilitated. Further, in the present invention, due to strong agitation in the treatment tank, settling and accumulation of the carriers in a region between the bottom surface of the treatment tank and the vertical positions of air supply openings of the air-diffusing apparatus can be prevented, so that a great part of the carriers charged in the treatment tank can be flowed and effectively utilized, to thereby reduce the amount of carriers charged in the treatment tank to as low level as possible.

Further, the underwater agitation type aeration apparatus having an air-diffusing mechanism on a discharge side of an impeller used in the present invention has a relatively small surface area and does not have a large number of small holes, so that it is unnecessary to remove the carriers from the treatment tank for exchanging the underwater agitation type aeration apparatus. In the aerobic treatment tank of the present invention, it is unnecessary to provide preventive walls or movable agitating means, so that costs of equipment and costs of operation can be reduced. Further, in the aerobic treatment tank of the present invention, circulation of the carriers occurs in all regions, so that treatment performance is high in the entire treatment tank.

According to another embodiment of the present invention, in the deep aeration tank utilizing microorganism-immobilized carriers, the underwater agitation type aeration apparatus having a draft tube connected at a lower part thereof is provided, so that settling of the carriers on the bottom surface of the tank can be prevented. Further, the liquid-waste treatment can be conducted in a manner which is energy-saving because the amount of air for aeration can be reduced, and the abilities of carriers can be utilized to a maximum degree because the concentration of carriers in the tank is uniform.

What is claimed is:

1. An apparatus for subjecting liquid waste to an aerobic treatment with use of carriers having microorganisms immobilized thereon while aerating the liquid waste, said apparatus comprising:

a treatment tank having an inflow end for receiving liquid waste to be treated and an outflow end for discharging treated liquid, said inflow end and said outflow end being horizontally spaced from each other, whereby during treatment said tank has therein a liquid mixture of the liquid waste being treated and carriers;

a carrier outflow preventing device at said outflow end for preventing discharge of carriers from said outflow end;

a plurality of underwater agitation type aeration apparatuses, provided in said tank between said inflow end and said outflow end thereof, for circulating the liquid waste and the carriers through said tank such that the carriers are substantially uniformly distributed in a floating state in said tank, each said underwater agitation type aeration apparatus comprising:

a casing having a suction opening and a discharge opening;

an impeller provided in said casing for drawing the liquid waste and carriers into said casing through said suction opening and out through said discharge opening in a radially outward direction;

an air-diffusing mechanism provided a discharge side of said impeller for diffusing air into the liquid waste and carriers being discharged from said discharge opening; and a draft tube extending from said suction opening; and each said underwater agitation type aeration apparatus being positioned in said tank such that:

said impeller is oriented to have a vertical axis of rotation;

said discharge opening is positioned above a bottom of said tank at a location to be at an intermediate position with respect to the depth of the liquid mixture in said tank during treatment; and said draft tube extends from said suction opening toward said bottom, such that said each underwater agitation type aeration apparatus suctions the liquid waste and carriers in the vicinity of said bottom in through said draft tube and discharges the thus suctioned liquid waste and carriers through said discharge opening in said radially outward direction at said intermediate position.

2. An apparatus as claimed in claim 1, incorporated into one of an apparatus for denitrification of liquid waste or an apparatus for dephosphorization of liquid waste.

3. An apparatus as claimed in claim 1, further comprising a carrier transfer pump for withdrawing carriers from the vicinity of said outflow end and for transferring the thus withdrawn carriers to a region in the vicinity of said inflow end, thereby preventing a concentration of the carriers in said outflow end.

* * * * *

UNITED STATES PATENT AND TRADEMARK OFFICE
CERTIFICATE OF CORRECTION

PATENT NO. :   6,077,424
DATED      :   June 20, 2000
INVENTOR(S):   Noboru KATSUKURA et al.

It is certified that error appears in the above-identified patent and that said Letters Patent is hereby corrected as shown below:

Title page,
In item [54], line 2, change "WASTEWATER" to --LIQUID-WASTE--.

In column 1, line 2, change "WASTEWATER" to --LIQUID-WASTE--.

Signed and Sealed this

Twenty-second Day of May, 2001

*Attest:*

NICHOLAS P. GODICI

*Attesting Officer*    *Acting Director of the United States Patent and Trademark Office*